UNITED STATES PATENT OFFICE.

EMILE AUGUSTE LÉOPOLDE ROUXEVILLE, OF PARIS, FRANCE.

CELLULOID SUBSTITUTE AND PROCESS OF MAKING THE SAME.

No. 881,827.      Specification of Letters Patent.      Patented March 10, 1908.

Application filed June 3, 1907. Serial No. 376,972.

*To all whom it may concern:*

Be it known that I, EMILE AUGUSTE LÉOPOLDE ROUXEVILLE, a citizen of the Republic of France, residing at 41 Rue de Paradis, France, have invented new and useful Improvements in Celluloid Substitutes and Processes of Making the Same, of which the following is a specification.

This invention relates in particular to the manufacture of a kind of celluloid in which the camphor is replaced by a product obtained by the polymerization of oil of turpentine or by any individual hydrocarbon of the terpene series.

The invention is based on the application of the product obtained by treating oil of turpentine with strong sulfuric acid. By such treatment the oil of turpentine is made to undergo polymerization and a complex viscid product is obtained which contains a number of well defined bodies such as cymen, terebene, diterebene, colophene, camphene and terpilene in addition to other products of polymerization and oxidation that are less well defined. All these bodies and products taken individually have the same properties as the complex product. They can thus be used individually or mixed together, but as the manufacture of the individual bodies is comparatively costly, it is more economical to use the complex product itself instead of its constituents.

In the explanations to be given hereafter the term "complex product" will be used to designate the product of polymerization as well as the constituents of this product. It may be observed first of all that, as compared with the properties of cellulose and its derivatives the complex product has the following properties. 1. It has certain solvents in common with cellulose and its derivatives (ketones, alcohol, acetic acid, ether). 2. It can dissolve under certain conditions cellulose and its derivatives. The above properties are increased when the complex product has been nitrated *i. e.* treated with nitric acid.

In order to mix the complex product with cellulose or its derivatives for the purpose of obtaining the new article of manufacture the following two methods may be adopted.

A. As certain derivatives of cellulose have solvents in common with the complex product, the cellulose derivative and the complex product need merely be dissolved in the same solvent, whereupon the two solutions are mixed. In this case nitro cellulose is used with preference and acetone as a solvent. Instead of using the complex product directly it is found to be preferable to nitrate the same with nitric acid. This nitrated complex product is prepared as follows: 100 gr. of oil of turpentine, either pure or with an addition of resin, are treated at low temperature with 80 to 100 gr. of strong sulfuric acid. The mixture is allowed to stand and a black viscid substance will be found to be formed which is afterwards separated from the remaining acid liquid. This viscid body is then treated with nitric acid, either with concentrated nitric acid at low temperature or with nitric acid mixed with 50 per cent of water at a raised temperature. After cooling the acids are removed either by washing repeatedly with water or by neutralization with an alkali. If necessary the nitrated complex product thus obtained is purified by dissolving the same in acetone or by way of distillation. A solution of this nitrated complex product in acetone is mixed with a solution of nitrocellulose or some other cellulose derivative in the same solvent, whereupon the acetone is evaporated. The acetone may be recovered. A homogeneous mass will thus be obtained which is heated for one hour at a temperature of 100—140° C. either in a digester or in a compressor. Finally a homogeneous transparent plate is obtained which may be used as a substitute for cellulose or for other purposes. The new article thus obtained is much more stable than ordinary celluloid owing to the presence of the complex product or its components or derivatives. The article thus obtained may be considered to constitute a solution of nitro cellulose in the complex product. The proportions of the two bodies, complex product and nitrocellulose, will vary according to the object aimed at. The greater the proportion of nitrocellulose the harder and the more rigid the article obtained will be. The rigidity and hardness of the article can be increased further by adding resin or gum to the oil of turpentine. On the other hand, the plastic qualities of the new article may be increased by incorporating an oil in the mixture such as linseed oil or castor oil either before or after the treatment with acids.

B. As the complex product dissolves cellulose and its derivatives, the new article in question may also be obtained as follows. The complex product nitrated or not is mixed in proportions depending on the object aimed at with ordinary cellulose or nitrocellulose (i. e. with cotton, celluloid paste or gun cotton). Thereupon the mixture is heated between 100 and 140° C. in a digester or in a compressor for about one hour. A homogeneous mass is thus obtained which may be considered a solution of the cellulose or cellulose derivative in the complex product. This second process may be varied by mixing the cellulose with the complex product and treating the mixture with nitric acid. In this case it is found advisable to proceed as follows: Ordinary cotton is added to the black viscid product obtained by treating oil of turpentine with sulfuric acid and the two products are then mixed on the water-bath. The mixture is then treated with nitric acid as described above and the acids are afterwards removed by decantation, by washing with water or by neutralization. Finally the mixture is heated as indicated above.

It will be observed that, as has been stated in the applications referred to above, the complex product has the property of dissolving when heated vulcanized or ordinary india rubber as well as gutta percha. Consequently as the complex product is also able to dissolve cellulose and its derivatives, it is easy to obtain a very varied series of mixtures of cellulose or its derivatives, gutta percha, india rubber, artificial substitutes of india rubber and the complex product. Each of these mixtures will have particular properties and particular applications according to the preponderant proportion of one of these five classes of bodies. It will also be readily understood as has been stated in the above mentioned applications that the complex product has a great affinity for sulfur. Consequently all the mixtures referred to above can be vulcanized, if necessary, thus causing them to attain greater stability and rigidity. Finally, all the mixtures referred to having cellulose as their main constituent, can be decolorized or bleached by using suitable chemicals such as chlorin or compounds of chlorin, etc. that are usually used in chemical industries particularly in the manufacture of celluloid.

I claim:

1. The process of making a celluloid substitute, which consists of polymerizing oil of turpentine or its equivalent and mixing the product with nitro cellulose dissolved in acetone, substantially as described.

2. The process of manufacturing a celluloid substitute, which consist in polymerizing oil of turpentine or its equivalent with sulfuric acid, mixing the product with nitro cellulose dissolved in acetone, and evaporating off the acetone.

3. The process of manufacturing a celluloid substitute, which consists in polymerizing oil of turpentine or its equivalent by means of sulfuric acid, removing the excess of acid, treating the product with nitric acid, removing the excess of said nitric acid, mixing the product with nitro cellulose dissolved in acetone, and evaporating off the acetone, substantially as described.

4. The process of manufacturing a celluloid substitute, which consists in dissolving celluloid, or its equivalents, in acetone or its equivalents, and mixing with said acetone solution a complex product obtained by polymerizing oil of turpentine or its equivalents, substantially as described.

5. A celluloid substitute composed of a solution of nitro cellulose mixed with a polymerized product of the oil of turpentine or its equivalents, substantially as described.

6. A new article of manufacture, a celluloid substitute composed of an acetone solution, mixed with a complex product obtained by the polymerization of oil of turpentine or its equivalents and treated with nitric acid, the whole being hardened, substantially as described.

7. As a new article of manufacture, a celluloid substitute, consisting of cellulose or its equivalents mixed with a complex product obtained by the polymerization of oil of turpentine or its equivalent, substantially as described.

8. As a new article of manufacture, a celluloid substitute, composed of nitro cellulose or its equivalents mixed with the complex product obtained by the polymerization of oil of turpentine or its equivalents and sulfur, the whole being hardened, substantially as described.

EMILE AUGUSTE LÉOPOLDE ROUXEVILLE.

Witnesses:
FRANK WILLIAM HAY,
H. C. COXE.